UNITED STATES PATENT OFFICE.

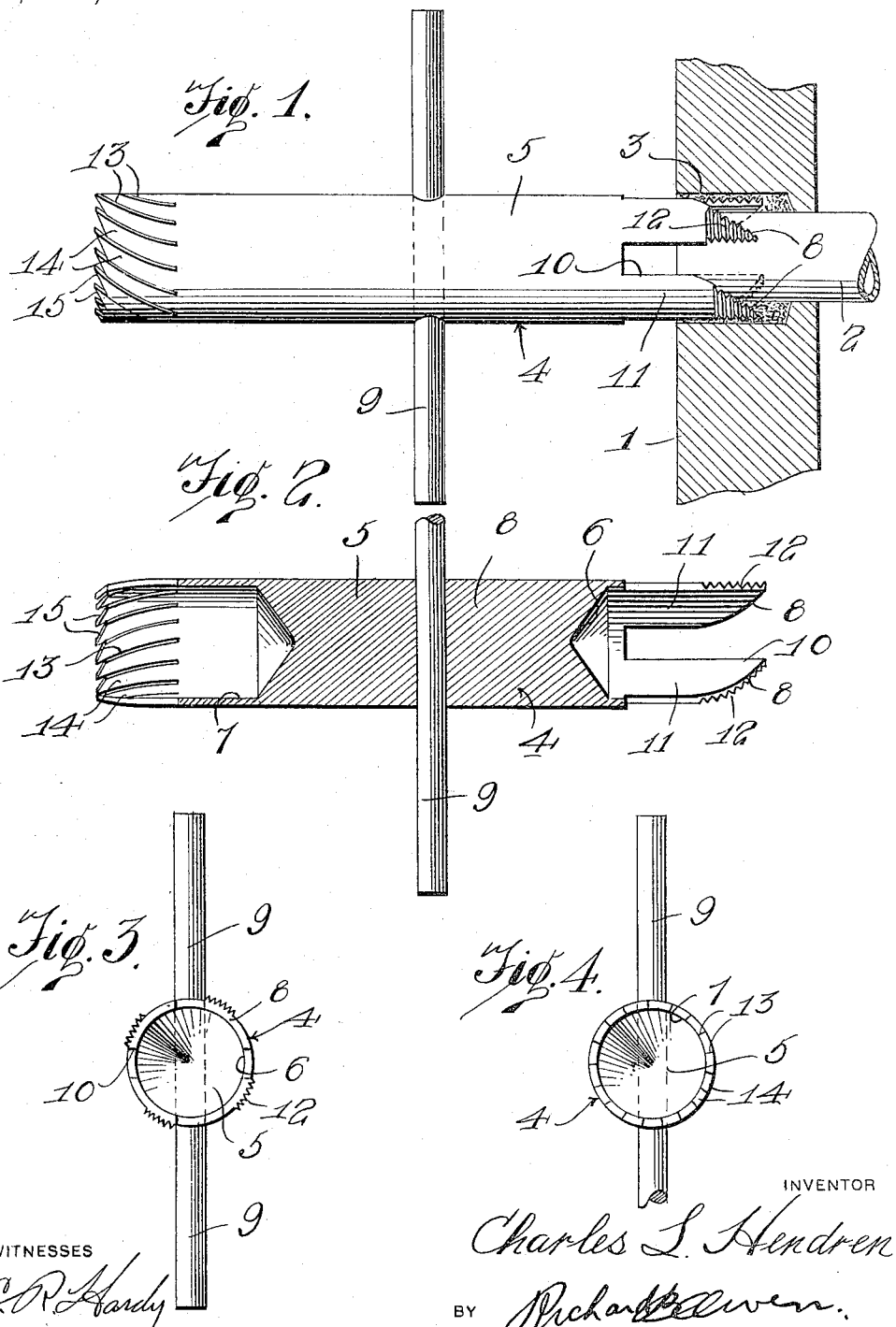

CHARLES L. HENDREN, OF WICHITA, KANSAS.

PACKING-EXTRACTOR.

1,195,220.

Specification of Letters Patent. Patented Aug. 22, 1916.

Application filed September 27, 1915. Serial No. 52,915.

*To all whom it may concern:*

Be it known that I, CHARLES L. HENDREN, a citizen of the United States, residing at Wichita, in the county of Sedgwick and State of Kansas, have invented certain new and useful Improvements in Packing-Extractors, of which the following is a specification.

My invention relates to a tool for removing the packing surrounding the ends of condenser or boiler tubes or other cylindrical elements, in their bearings in the end sheets of boilers, condensers, etc.

The invention may be said to consist in the novel construction, combination and arrangement of parts hereinafter more particularly described and specifically set forth in the appended claims.

In the drawings, annexed: Figure 1 is an elevation of the tool or implement illustrating the application of the invention; Fig. 2 is a longitudinal sectional view; Fig. 3 is an end view; and Fig. 4 is a similar view, the opposite end of the tool being shown.

Like numerals of reference designate like or corresponding parts throughout the several views.

Referring now to the drawings by numerals, 1 designates the tube sheet of a condenser apparatus, 2 a condenser tube supported thereby, 3 a threaded opening or recess ordinarily found in the tube sheet of the apparatus and 4, as an entirety, the cleaning implement or tool constituting the device of the invention here claimed.

The mentioned tool 4 in its preferred embodiment may be said to consist of a solid cylindrical body 5 recessed at one end as indicated at 6 and at its opposite end as indicated at 7. An opening 8 is formed in the body 5 that a handle 9 may pass therethrough to facilitate operation as hereinafter pointed out. The cylindrical wall of the recess 6 is longitudinally slotted as indicated at 10 to provide a plurality of extensions 11, each of which is cut away at its free end as indicated at 8 to terminate in what I shall hereinafter designate a "biting edge terminal". Threads 12 are formed upon the exterior surface of the several extensions 11 and in proximity to the biting edge terminals thereof that the several terminals, during a tube cleaning operation, may contact with the cylindrical threaded wall of the recess 3 and through such contact, and by turning the tool, automatically advance or turn the biting edge terminals until all packing within the recess 3 and around the tube 2 shall have been dislodged and removed. The opposite end of the body portion 5 from that having the extensions 11 formed thereon is recessed, as before stated, as indicated at 7. The cylindrical wall of the recess 7 is slightly tapered or converged to reduce the diameter of the tool at that end within which said recess 7 is formed. A plurality of uniformly spaced angular slits or kerfs 13 are formed in the cylindrical wall of the recess 7 that a plurality of cutting extensions may be formed. Each of the mentioned extensions terminate in a biting or cutting edge 15 that all packing may be removed from around the tube 2 subsequent to dislodgment by the threaded extensions 11 hereinbefore described.

In operation, and as suggested above, the threaded end of the tool is screwed in the recess 3 until all packing within the recess and around the tube 2 shall have been loosened or removed. Subsequent to such application of the tool, and should the packing still adhere to the outside surface of the tube 2, the opposite end of the tool is forced over the end of the tube and turned to remove from said tube all adhering packing, the extensions 14 and the biting edge terminals 15 thereof acting as a means whereby said tube may be cleaned.

It is evident from the foregoing that the threaded terminal spurs of the tube are caused to enter the space between the boiler tube and the inner surface of its bearing, lay hold of the packing therein, disintegrate it and force it out.

Having thus fully described my invention, what I claim as new and desire to secure by Letters Patent, is:—

1. In a packing extractor for boiler tube bearings and the like, a body having means for imparting rotation thereto and recessed at one end to present a tubular extension, said extension being externally threaded and slotted longitudinally to form an annular series of blades adapted to penetrate, disintegrate and withdraw the packing surrounding the tube.

2. A tool for extracting the packing surrounding boiler tubes and the like in their bearings, having a body adapted for rotation; said body being recessed at one end to present a tubular extension adapted to fit freely over the end of the tube, and externally threaded and slotted to form an annular series of blades designed to penetrate, disintegrate and withdraw the packing from the space around the tube.

3. A tool for extracting the packing surrounding boiler tubes and the like in their bearings, having a body for rotation; said body being recessed at one end to present a tubular extension adapted to fit freely over the end of the tube, and externally threaded and slotted to form an annular series of blades designed to penetrate, disintegrate and withdraw the packing from the space around the tube, said body being provided at its opposite end with a tubular extension formed as a series of spirally inclined and pointed teeth adapted to withdraw the disintegrated packing from around the tube.

4. In a packing extractor for boiler tube bearings and the like, a body recessed at one end to present a tubular extension, said extension being slotted longitudinally to form an annular series of blades designed to penetrate, disintegrate and withdraw the packing surrounding the tube by rotation of said body.

5. In a packing extractor for boiler tube bearings and the like, a body equipped at one end with a means to penetrate, disintegrate and withdraw the packing surrounding said tube, and at its opposite end with a tubular extension and a series of spirally inclined and pointed teeth adapted to withdraw the disintegrated packing from around said tube.

6. In a packing extractor for boiler tube bearings and the like, a body provided with means at one end thereof to penetrate, lay hold of, disintegrate and withdraw the packing surrounding said tube, said body being provided at its opposite end with means to withdraw the disintegrated packing from around said tube, and a means for imparting rotation to said body.

7. In a packing extractor for boiler tube bearings and the like, an exteriorly threaded tubular extension formed at one end of said body, said extension being slotted longitudinally to form an annular series of blades adapted to penetrate, disintegrate and withdraw the packing from said tube, said body being provided at its opposite end with a tubular extension formed as a series of spirally inclined and pointed teeth adapted to withdraw the disintegrated packing from around said tube, and a means for imparting rotation to said body.

In testimony whereof I affix my signature in presence of two witnesses.

CHARLES L. HENDREN.

Witnesses:
GEORGE POST,
H. E. BOWERS.

Copies of this patent may be obtained for five cents each, by addressing the "Commissioner of Patents, Washington, D. C."